United States Patent

Needles et al.

[11] 3,946,619
[45] Mar. 30, 1976

[54] SCRAPER ELEVATOR POWER CHAIN TENSIONING DEVICE

[75] Inventors: Stanton D. Needles; Allan R. Swanson, both of St. Joseph, Mich.

[73] Assignee: Clark Equipment Company, Buchanan, Mich.

[22] Filed: Dec. 9, 1974

[21] Appl. No.: 530,648

[52] U.S. Cl. .................................... 74/242.1 FP
[51] Int. Cl.² ..................... F16H 7/12; F16H 7/10
[58] Field of Search ........... 74/242.1 FP, 242.11 A, 74/242.14 R

[56] References Cited
UNITED STATES PATENTS

| | | | |
|---|---|---|---|
| 1,929,852 | 10/1933 | Reid | 74/242.11 A |
| 2,610,517 | 9/1951 | Hornbostel | 74/242.1 FP |
| 3,477,766 | 11/1969 | Linsay | 74/242.14 R X |
| 3,581,588 | 6/1971 | Eftefield | 74/242.14 R |
| 3,647,270 | 3/1972 | Althaus | 74/242.14 R X |
| 3,826,149 | 7/1974 | Freese | 74/242.1 A X |

*Primary Examiner*—Leonard H. Gerin
*Attorney, Agent, or Firm*—Kenneth C. Witt

[57] ABSTRACT

A chain tensioning device, especially for scraper elevators, in which the distance between the head and foot shafts of the elevator is power adjusted to obtain the proper chain tension. A pressure source delivering a relatively constant supply of low pressure hydraulic fluid, such as the charging circuit of a hydrostatic elevator drive, is used to static load a cylinder against the desired catenary loading under idle conditions to retension the chains.

4 Claims, 3 Drawing Figures

SCRAPER ELEVATOR POWER CHAIN TENSIONING DEVICE

BACKGROUND OF THE INVENTION

This invention pertains to the art of off-highway earth moving equipment and more particularly to self-loading tractor scrapers which employ an endless chain driven elevator for loading earth material into the bowl.

DESCRIPTION OF THE PRIOR ART

Scraper elevators of the type to which the present invention pertains have a series of flights fastened to a pair of endless chains driven over sprockets spaced at the opposite ends of a driven head or foot shaft. The upper strands of the chains may be supported on idler rollers because of the catenary sag. The lower strands are under tension because of the flights pulling the earth material into the bowl.

Chain wear is a common problem. If the chains become too loose, the sprockets will skip or the chains jump off. One tensioning device which has proved satisfactory is disclosed in U.S. Pat. No. 3,444,750, issued May 20, 1969 to the assignee of the present invention entitled "Adjustor Mechanism". In this patent the elevator side frame members are open at the bottom so as to receive a slidable arm on which the foot shaft is journaled. A sealed chamber within each of the side frames has an exposed Zerk fitting to which a grease gun may be applied for introducing grease into the chamber. When grease is forced into the chamber the plunger is extended forcing the slidable arm outwardly tensioning the elevator chains.

This arrangement is, of course, not automatic. It is necessary to continuously adjust the chain tension which requires periodic attention on the part of the operator.

SUMMARY OF THE INVENTION

A power chain tensioning device, especially for scraper elevator chains, in which a sorvce of pressure, such as the charging pressure of a hydrostatic elevator drive, is supplied to a cylinder which is extended to cause a change in the catenary loading of the chain.

Applied to a scraper elevator having side frames supporting at their lower ends a foot shaft and at their upper ends a head shaft on which are mounted aligned rotatable chain driving elements over which a pair of elevator chains run, the power chain tensioning device comprises a pair of cylinders, one on each side, connected to extensible frame sections of the elevator. The cylinders are static loaded under the given pressure to produce a predetermined extension of the elevator frame when the elevator is idle. The catenary tension of the elevator chains is thus retensioned to the desired level between loading cycles. When the elevator is running and dynamic loading would exceed the static cylinder loading, check valves hold the cylinders at the last extended position.

In the particular embodiment disclosed the cylinders have their rod ends filled with hydraulic fluid at atmospheric pressure and the fluid under pressure is supplied to the piston ends. After repeated adjustments the cylinder rods will be moved out. An equal volume of hydraulic fluid at the rod ends will be vented owing to the displacement of the piston rods.

A main advantage of the present power adjustment mechanism is that scraper elevators, which have heretofore required the operator to make periodic adjustments, are now capable of being power adjusted automatically to maintain the correct chain tension at all times.

Another advantage is that where before the correct chain tension was largely a matter of judgment, such as by measuring the catenary sag, with the present arrangement the proper chain tension is designed into the system. Once the static chain tension requirements are given for a particular elevator, the cylinder loading at which equilibrium exists is predetermined.

These and other advantages will become more apparent by referring to the following detailed description which proceeds with a description of the drawings wherein:

DETAILED DESCRIPTION OF THE DRAWINGS

DESCRIPTION OF THE PREFERRED EMBODIMENT

Figure 1:
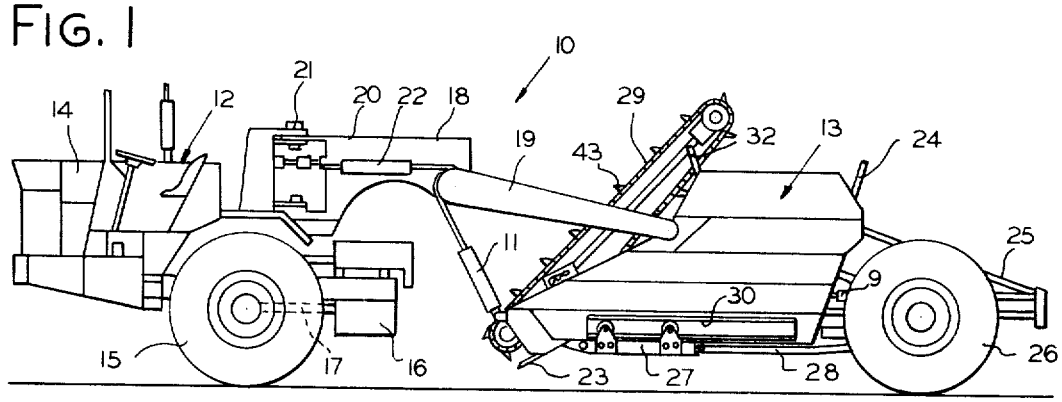
FIG. 1 is a side elevational view of an elevating tractor scraper.
Figure 2:
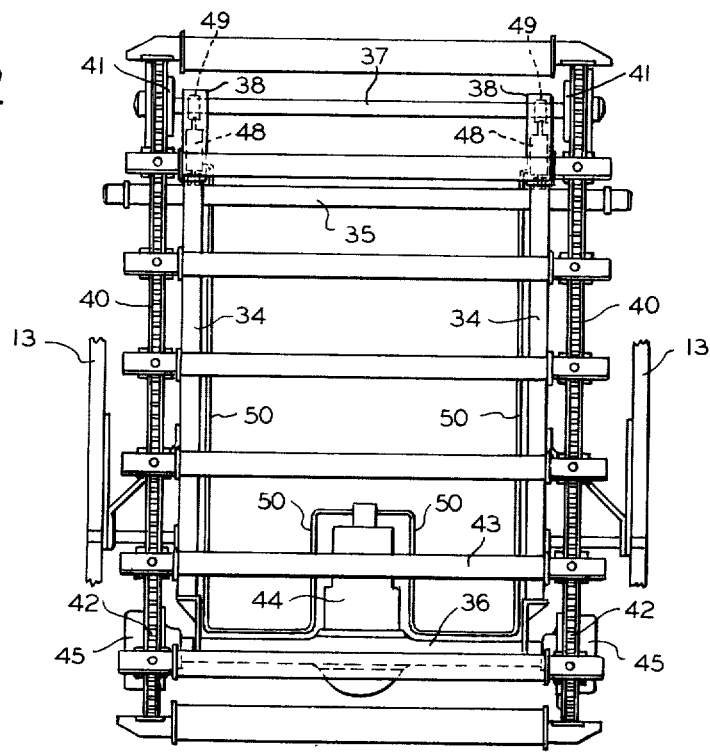
FIG. 2 is a partial plan view into the scraper bowl showing an elevator having an hydraulic drive at the foot shaft connected to the power tensioning device.
Figure 3:
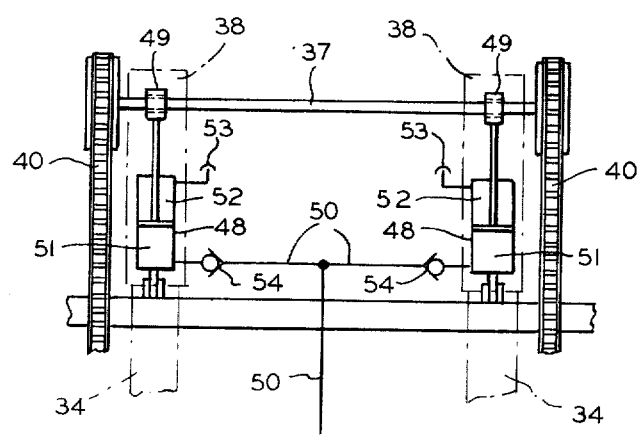
FIG. 3 is a hydraulic diagram of the power tensioning circuit.

FIG. 1 shows a tractor scraper 10 having a tractor 12 towing scraper 13. The tractor engine at 14 powers the tractor wheels 15 through a transfer case 16 and drive line 17. The scraper 13 is supported at the front by a yoke 18 having a pair of arms 19 pivoted to the side walls of the scraper and a goose neck 20 pivoted on the tractor trunnion 21. Steering jacks 22, one on each side of the goose neck, pivot the tractor relative to the scraper on the vertical trunnion axis. A pair of hydraulic cylinders 11, one on each side, pivotally supports the front of the bowl. The cylinders 11 are extended to lower the cutting blade 23 into engagement with the ground and are raised for hauling the load. The scraper bowl is closed at the rear by an end gate 24 which is operated by an actuator 9 mounted on the pusher frame 25 supporting the scraper wheels 26. The actuator 9 also operates a rolling door 27 by a linkage 28 which pulls the door on a track 30 to open the floor of the bowl so that dirt may be dumped when the end gate 24 is pushed forwardly by the actuator. A scraper elevator 29 extends across the front of the bowl and is pivotally supported on each side from the scraper side walls by a pair of links 32 which permit the elevator to rise and fall in relationship to the blade 23 when in digging engagement with the ground. The elevator has a frame (FIG. 2) with longitudinally extending side frames 34 connected intermediate their ends by cross members 35. The opposite ends of upper cross member 35 extend beyond the side frames 34 for pivotally mounting the elevator on the links 32. The side frames 34 support at their lower ends a foot shaft 36. A head shaft 37 is mounted on extensible frame sleeves 38 telescoping over the upper ends of the side frames 34. A pair of endless chains 40 run over rotatable chain drive elements 41, 42 on opposite ends of the head and foot shafts. When driven, the elevator travels with the upper chain strands moving downwardly, around the foot shaft drive sprockets 42, and with the lower chain strands moving up on the underside and then returning to the idler wheels 41 at the top. Elevator flights 43 are attached to the chains. The elevator drive 44 is a hydrostatic unit mounted at the center on the foot shaft 36 between the upper and lower chain strands having its output connected to an axle drive having a pair of planetary hubs 45 at each end providing the necessary gear reductions for the elevator drive sprockets 42.

The telescoping sleeves 38 house a pair of hydraulic cylinders 48 pivotally mounted at their lower ends to the cross member 35 inside the side frames 34 and pivotally mounted at their upper ends to a bushing 49 which rotatably supports the head shaft 37. Each cylinder 48 is connected at the piston end 51 to receive hydraulic fluid under pressure from a line 50 connected to the charging circuit of the hydrostatic elevator drive 44. The rod end 52 of each cylinder 48 is filled with hydraulic fluid which is vented at 53 to atmosphere. A pair of check valves 54 in each of the lines 50 leading to the piston ends 51 of the cylinders holds the pistons at the statically adjusted position.

During loading operations, the elevator will be driven by the hydrostatic drive 44. However, when hauling or dumping the load, the elevator is normally idle. It is during these periods that the relatively low charging pressure of the charging pumps in the elevator drive unit 44 can be used to supply the pressure to adjust the cylinders 48 to retension the chains. Of course, if the elevator is not of the type having a hydrostatic drive, then the transmission clutch pressure of the tractor may be used or some other steady state, low pressure source. The cylinders 48 are statically loaded against the catenary load of the chains for the proper tension at idle conditions. The check valves 54 prevent any escape of hydraulic fluid from the piston ends 51 of the cylinders during dynamic loading which will exceed the equilibrium catenary loading. The fluid which fills the rod ends 52 of the cylinders is gradually expelled through the vents 53 as the equilibrium position of the pistons is displaced toward the rod ends during the course of successive retensioning operations.

While one preferred embodiment of my invention has been disclosed it will be understood that the description is for purposes of illustration only and that various modifications and changes may be made without departing from the nature of the invention which is defined in the appended claim.

I claim:

1. In a tractor scraper comprising a self-propelled tractor towing a scraper bowl comprising spaced side walls, an end gate extending across the bowl at the rear and movable between the side walls for expelling dirt material, a floor having an opening at the front portion thereof through which the dirt material is discharged, a rolling door closing the opening when loading earth material in the bowl and movable rearwardly beneath the floor when the end gate is ejecting the earth material through the opening, a fixed blade at the front of the bowl, means for lowering the bowl bringing the blade into engagement with the ground for digging, a scraper-type elevator mounted at the front of the bowl having its lower end adjacent the blade comprising a pair of endless chains, one on each side, a pair of elevator side frames pivotally attaching the elevator to the side walls of the bowl, a head shaft rotatably mounted at the upper ends of the side frames, a foot shaft rotatably mounted at the lower ends, drive sprockets at opposite ends of one of said shafts and idler wheels on the other, said chains being driven by the drive sprockets over the idler wheels and a plurality of spaced scraper-type elevator flights carried downwardly on the upper chain lengths, around the foot shaft and upwardly on the lower chain lengths contacting the earth material adjacent the blade and heaping it in the bowl during the loading cycle, the improvement wherein a power chain tensioning device is built into the elevator side frames and comprises a slidable section movable longitudinally relative to a stationary section, a pair of cylinders, one within each side frame, acting between the stationary and slidable sections thereof for adjusting the length of the elevator frame and therefore the space between the foot and head shafts, a steady state, relatively low, on board vehicle source available during periods of elevator idleness, fluid lines connecting the pressure source to each hydraulic cylinder causing the slidable sections to adjust according to an equilibrium pressure in each cylinder against the established chain tension when the elevator is stopped and check valve means between each cylinder and the source of pressure preventing escape of fluid from the cylinders for maintaining the tension during the elevator loading cycles.

2. The improvement according to claim 1 wherein the side of each cylinder opposite the equilibrium pressure side is vented to atmosphere and the cylinder chamber is filled with a hydraulic fluid which is allowed to escape through said vents as extensions of the side frame occur.

3. The improvement according to claim 1 wherein the drive sprockets are mounted on the foot shaft and the slidable sections of the elevator side frames rotatably support the head shaft.

4. The improvement according to claim 1 wherein the drive sprockets are mounted on the foot shaft, a hydrostatic drive unit is mounted between the upper and lower chain lengths and drives said sprockets in unison at opposite ends of the foot shaft, said hydrostatic drive including a charging pressure source which is available as said static state, low pressure source for establishing the equilibrium pressure in the adjuster cylinders during idle periods of the elevator.

* * * * *